United States Patent [19]
Gilliland

[11] Patent Number: 5,999,642
[45] Date of Patent: Dec. 7, 1999

[54] METHOD AND APPARATUS FOR DETERMINING THE CONFIGURATION OF A WORKPIECE

[76] Inventor: Malcolm T. Gilliland, 310 Pine Valley Rd., Marietta, Ga. 30067

[21] Appl. No.: 08/872,821

[22] Filed: Jun. 11, 1997

Related U.S. Application Data

[63] Continuation-in-part of application No. 08/829,949, Apr. 1, 1997
[60] Provisional application No. 60/017,129, Apr. 22, 1996, and provisional application No. 60/016,805, Apr. 30, 1996.

[51] Int. Cl.$^6$ .................................................. G06K 9/00
[52] U.S. Cl. ............................ 382/154; 348/90; 382/152
[58] Field of Search .................................... 382/154, 318, 382/152, 319; 348/42, 47, 86, 90; 356/3, 12, 376, 237

[56] References Cited

U.S. PATENT DOCUMENTS

| | | | |
|---|---|---|---|
| 5,446,798 | 8/1995 | Morita et al. | 382/154 |
| 5,606,627 | 2/1997 | Kuo | 382/154 |
| 5,694,483 | 12/1997 | Onoguchi | 382/154 |
| 5,699,444 | 12/1997 | Palm | 382/106 |

Primary Examiner—Christopher S. Kelley
Attorney, Agent, or Firm—Smith, Gambrell & Russell LLP; Charles L. Warner, II

[57] ABSTRACT

The present invention provides a method and an apparatus for scanning an object to obtain data on the object and determine the configuration of the object. A gantry (12) allows movement along a first direction (A–A'). A set of platforms (14A, 14B) allows movement along a second direction (B–B'). A set of cameras (16A and 16B) provide additional degrees of freedom and also provide for scanning the object (10) to obtain information about the object. The freedom of movement provided by the gantry, the platforms, and the cameras allows the object to be completely scanned. In addition, once the initial scanning process has been completely, areas which require additional scanning, such as compartments (10D), are identified. The cameras are then positioned, such as directly above or inside a compartment, and then the compartment is scanned to obtain information about the compartment that could not be obtained from the initial scanning procedure. The data obtained from the initial scan and any subsequent scans is processed to determine the configuration of the object. The information concerning the configuration is then used to perform a welding, cutting or other operation on the object.

4 Claims, 15 Drawing Sheets

METHOD AND APPARATUS FOR DETERMINING THE CONFIGURATION OF A WORKPIECE

CROSS REFERENCE TO RELATED APPLICATION

This application is a continuation-in-part of U.S. patent application Ser. No. 08/829,949, filed Apr. 1, 1997, which claims the priority of U.S. Provisional Patent Application No. 60/017,129, filed Apr. 22, 1996, and U.S. Provisional Patent Application No. 60/016,805, filed Apr. 30, 1996, all of which are hereby incorporated herein by reference.

TECHNICAL FIELD

This invention relates to robotic welding systems and, more particularly, discloses a method and an apparatus for determining the configuration of a workpiece so that a robot welder will have the proper coordinates for the welding operation.

BACKGROUND OF THE INVENTION

Robotic, or automatic, welders accurately perform welding operations which would be difficult and/or time consuming if performed by a human. Human welders can visually perceive the area of the welding operation, the location of the elements to be welded, and compensate for the misalignment of the elements. However, robotic welders do not have such intelligence and need information about the workpiece, such as the coordinates of the elements to be welded, any elements which must be worked around, etc. This information is generally provided by a human, at least to some degree. For example, a human operator may, using manual controls, move the robotic welder sensing arm about the workpiece and instruct the robotic welder to store the coordinates of the bottom plate, an intersection of elements, a corner, etc. Also, the robotic welder can accept information about the ideal element locations from a computer assisted design (CAD) program which was used to draw the plans for the workpiece to be welded.

Elements may not be always placed in their "ideal" locations, they may be offset or skewed. In many cases, this offset or skew does not affect the structural integrity of the finished product as long as the offset or skew is within certain, usually generous, tolerances.

A robotic welder, especially one which has a "touch-sense" feature, can compensate for some offset or skew. However, if the offset or skew exceeds a certain amount then the robotic welder may start outside a compartment, rather than within it, and thereby perform the wrong welding operation.

The related patent applications listed above describe methods for determining the configuration of a workpiece. However, laser equipment, while providing exact information, is expensive and the accuracy provided may be more precise than needed for the particular project.

Therefore, there is a need for a method which is lower in cost but still accurately determines the locations of the elements, as placed, so that the configuration of the workpiece will be accurately known by the robotic welder.

SUMMARY OF THE INVENTION

The present invention provides a method whereby the workpiece is automatically scanned to determine the precise location of the various elements. This information is then provided to the robotic welder so that the robotic welder will have exact information concerning the configuration of the workpiece and can flawlessly perform the programmed welding operation, even if the elements are not in the locations specified by the drawings for the workpiece.

The method of the present invention includes the steps of automatically scanning the workpiece from a plurality of locations to generate a three-dimensional picture of the workpiece, and then using this three-dimensional picture of the workpiece to obtain exact information regarding the location and orientation of each of the elements.

By scanning the workpiece from a plurality of locations (observation points) the present invention eliminates shadowing and other problems that may occur when one element conceals another element when viewed from a single observation point. Thus, even though a larger element may completely conceal a smaller element when the workpiece is viewed from a first observation point, the smaller element will be detected and its coordinates and other information obtained when the workpiece is viewed from a second observation point.

The scanning is performed using two cameras which have an automatic focusing feature. Such cameras are commercially available and are substantially less expensive than laser scanning devices.

The present invention provides a method for determining the configuration of an object. The method includes the steps of setting a first camera to a first camera initial position, setting a second camera to a second camera initial position, scanning the object from the first camera initial position to a first camera end position to obtain data on a plurality of first camera observed points for the object, scanning the object from the second camera initial position to a second camera end position to obtain data on a plurality of second camera observed points for the object, processing the data for the first camera observed points and the second camera observed points to determine valid observed points, and processing the valid observed points to determine the configuration of the object. The data for the first camera observed points and the second camera observed points includes at least one of a picture of the object and ranging information to the object.

The present invention also provides a method for determining planes in an object and determining intersection lines for the planes. This method includes the steps of setting a first camera to a first camera initial position, setting a second camera to a second camera initial position, scanning the object from the first camera initial position to a first camera end position to obtain data on a plurality of first camera observed points for the object, scanning the object from the second camera initial position to a second camera end position to obtain data on a plurality of second camera observed points for the object, processing the data for the first camera observed points and the second camera observed points to determine valid observed points, inspecting the valid observed points to define a first plane, the first plane comprising a first plurality of the valid observed points, inspecting the valid observed points to define a second plane, the second plane comprising a second plurality of the valid observed points, determining an intersection line for the first plane and the second plane, and specifying the intersection line by at least a starting point and an ending point. The data for the first camera observed points and the second camera observed points includes at least one of a picture of the object and ranging information to the object.

The present invention also provides a method for determining planes in an object, determining intersection lines for the planes, determining whether the intersection lines are straight or curved, and specifying points for the intersection lines. This method includes the steps of setting a first camera to a first camera initial position, setting a second camera to a second camera initial position, scanning the object from the first camera initial position to a first camera end position to obtain data on a plurality of first camera observed points for the object, scanning the object from the second camera initial position to a second camera end position to obtain data on a plurality of second camera observed points for the object, processing the data for the first camera observed points and the second camera observed points to determine valid observed points, inspecting the valid observed points to define a first plane, the first plane comprising a first plurality of the valid observed points, inspecting the valid observed points to define a second plane, the second plane comprising a second plurality of the valid observed points, determining an intersection line for the first plane and the second plane, determining whether the intersection line is a straight line or is a curved line, if the intersection line is a straight line then specifying the intersection line by at least a starting point and an ending point, and if the intersection line is a curved line then specifying a plurality of points for the intersection line. The data for the first camera observed points and the second camera observed points includes at least one of a picture of the object and ranging information to the object.

The step of specifying the plurality of points for the intersection line if the intersection line is a curved line comprises selecting a first point and a second point for the intersection line, the first point and the second point being points on the intersection line and being separated by a first distance, defining a direct line by the first point and the second point, defining a desired curved line by the first point, the second point, and points on the intersection line between the first point and the second point, determining a maximum difference between the direct line and the desired curved line, if the maximum difference is greater than a predetermined amount then selecting a different second point, the different second point being separated from the first point by less than the first distance, and repeating the steps of defining the direct line, defining the desired curved line, and determining the maximum difference until the maximum difference is not greater than the predetermined amount, and when the first point and the second point have been selected wherein the maximum difference is not greater than the predetermined amount, storing the first point and the second point and then, using the second point as a next the first point, repeating the above steps until the plurality of points for the intersection line have been selected.

The present invention also provides an apparatus for determining the configuration of an object. The apparatus has a first camera for scanning the object to obtain data on a plurality of first camera observed points for the object, a second camera for scanning the object to obtain data on a plurality of second camera observed points for the object, first means for moving the first camera along a first path from a first camera initial position to a first camera end position, second means for moving the second camera along a second path from a second camera initial position to a second camera end position, and a controller for controlling the operation of the first camera, the second camera, the first means, and the second means, for receiving the data, for processing the data for the first camera observed points and the second camera observed points to determine valid observed points, and processing the valid observed points to determine the configuration of the object. The data for the first camera observed points and the second camera observed points includes at least one of a picture of the object and ranging information to the object.

The present invention also provides another apparatus for determining the planes and intersection lines of the planes of an object.

The apparatus has a first camera for scanning the object to obtain data on a plurality of first camera observed points for the object, a second camera for scanning the object to obtain data on a plurality of second camera observed points for the object, first means for moving the first camera along a first path from a first camera initial position to a first camera end position, second means for moving the second camera along a second path from a second camera initial position to a second camera end position, and a controller for controlling the operation of the first camera, the second camera, the first means, and the second means, for receiving the data, for processing the data for the first camera observed points and the second camera observed points to determine valid observed points, and processing the valid observed points to define a first plane and a second plane, for determining an intersection line for the first plane and the second plane, and for specifying the intersection line by at least a starting point and an ending point. The data for the first camera observed points and the second camera observed points includes at least one of a picture of the object and ranging information to the object.

The present invention also provides another apparatus for determining the planes and intersection lines of the planes of an object, determining whether the intersection lines are straight or curved, and specifying points for the intersection lines. The apparatus has a first camera for scanning the object to obtain data on a plurality of first camera observed points for the object, a second camera for scanning the object to obtain data on a plurality of second camera observed points for the object, first means for moving the first camera along a first path from a first camera initial position to a first camera end position, second means for moving the second camera along a second path from a second camera initial position to a second camera end position, and a controller for controlling the operation of the first camera, the second camera, the first means, and the second means, for receiving the data, for processing the data for the first camera observed points and the second camera observed points to determine valid observed points, and processing the valid observed points to define a first plane and a second plane, for determining an intersection line for the first plane and the second plane, for determining whether the intersection line is a straight line or is a curved line, for specifying the intersection line by at least a starting point and an ending point if the intersection line is a straight line, and for specifying a plurality of points for the intersection line if the intersection line is a curved line. The data for the first camera observed points and the second camera observed points includes at least one of a picture of the object and ranging information to the object.

Another apparatus for determining the planes and intersection lines of the planes of an object, determining whether the intersection lines are straight or curved, and specifying points for the intersection lines has a first camera for scanning the object to obtain data on a plurality of first camera observed points for the object, the data for a the first camera observed point including at least one of a picture of the object and ranging information to the object, a second camera for scanning the object to obtain data on a plurality of second camera observed points for the object, the data for a the second camera observed point including at least one of a picture of the object and ranging information to the object, first means for moving the first camera along a first path from a first camera initial position to a first camera end position, second means for moving the second camera along a second path from a second camera initial position to a second camera end position, and a controller for controlling the operation of the first camera, the second camera, the first means, and the second means, for receiving the data, for processing the data for the first camera observed points and the second camera observed points to define a first plane and a second plane, for determining an intersection line for the first plane and the second plane, for determining whether the intersection line is a straight line or is a curved line, for specifying the intersection line by at least a starting point and an ending point if the intersection line is a straight line, and, if the intersection line is a curved line then for selecting a first point and a second point for the intersection line, the first point and the second point being points on the intersection line and being separated by a first distance, for defining a direct line by the first point and the second point, for defining a desired curved line by the first point, the second point, and points on the intersection line between the first point and the second point, for determining a maximum difference between the direct line and the desired curved line, for selecting a different second point if the maximum difference is greater than a predetermined amount, the different second point being separated from the first point by less than the first distance, until the maximum difference is not greater than the predetermined amount, and then for storing the first point and the second point, for using the second point as a next the first point, and for defining additional direct lines until the plurality of points for the intersection line have been selected. The data for the first camera observed points and the second camera observed points includes at least one of a picture of the object and ranging information to the object.

The controller in the present invention provides the configuration information determined as mentioned above to a subsequent operation, such as a welding operation, or provides the configuration information to another apparatus for use in a subsequent operation.

The step of specifying the plurality of points for the intersection line if the intersection line is a curved line comprises selecting a first point and a second point for the intersection line, defining a straight line by the first point and the second point, defining a desired curved line by the first point, the second point, and points on the intersection line between the first point and the second point, determining a maximum difference between the straight line and the desired curved line, if the maximum difference is greater than a predetermined amount then selecting a different second point and repeating these steps until the maximum difference is not greater than the predetermined amount, and, when the first point and the second point have been selected such that the maximum difference is not greater than the predetermined amount, then storing the first point and the second point and, using the second point as a next first point, repeating these steps until the plurality of points for the intersection line have been selected. The first point and the second point are points on the intersection line and are separated by a first distance, and the different second point is separated from the first point by less than the first distance.

Another apparatus for determining the configuration of an object also includes scanning means for scanning the object to obtain data on the object, first means for moving the scanning means along a first path, second means for moving the scanning means along a second path, and a controller. The controller again controls the operation of the scanning means, the first means, and the second means, receives the data from the scanning means, processes the data to define a first plane and a second plane, determines an intersection line for the first plane and the second plane, and determines whether the intersection line is a straight line or is a curved line. Then, if the intersection is a curved line, the controller selects a first point and a second point for the intersection line, the first point and the second point being points on the intersection line and being separated by a first distance, defines a direct line by the first point and the second point, defines a desired curved line by the first point, the second point, and points on the intersection line between the first point and the second point, determines a maximum difference between the direct line and the desired curved line, selects a different second point if the maximum difference is greater than a predetermined amount, the different second point being separated from the first point by less than the first distance, until said maximum difference is not greater than said predetermined amount, and then for storing said first point and said second point, for using said second point as a next said first point, and for defining additional direct lines until said plurality of points for said intersection line have been selected.

Thus, the present invention provides a method and an apparatus for automatically scanning an object, determining the configuration of the object, and performing an operation upon the object based upon this configuration using low cost, readily available, autoranging cameras.

Other objects, features, and advantages of the present invention will become apparent upon reading the following description of the preferred embodiment, when taken in conjunction with the drawings and the claims.

DETAILED DESCRIPTION OF THE INVENTION

Figure 1:
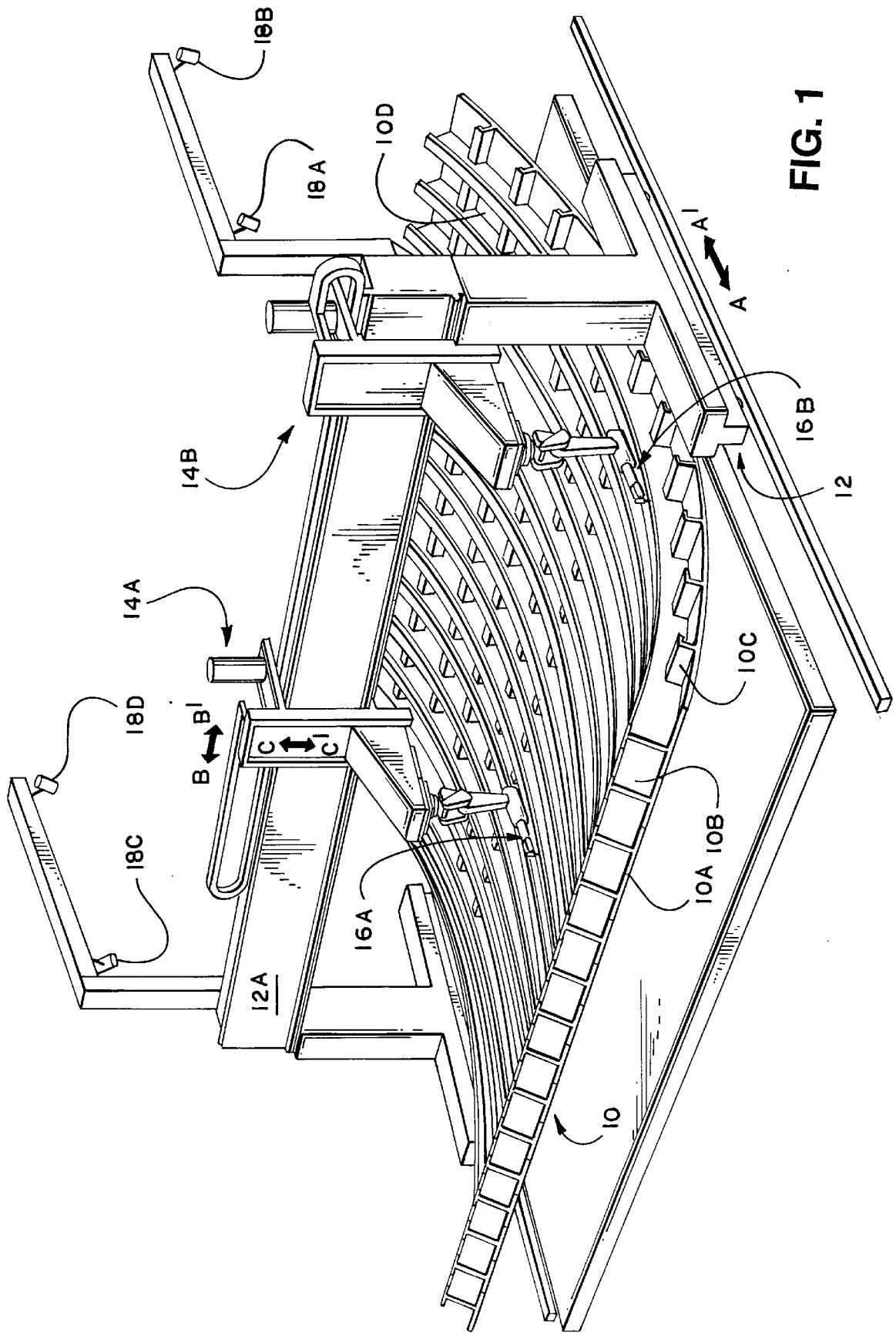
FIG. 1 is an illustration of the preferred embodiment of the present invention.

FIG. 1 is an illustration of the preferred embodiment of the present invention. A workpiece 10 is shown. The workpiece 10 comprises a plurality of elements, such as a bottom plate 10A, a plurality of larger transverse I-beams 10B, a plurality of smaller longitudinal I-beams 10C, and a plurality of compartments 10D. It will be appreciated that the elements 10B, 10C cooperate to form compartments 10D. Further, in the illustration, it will be noted that the workpiece 10 is not a flat object, but is curved.

A gantry 12 provides movement along path A–A'. Thus, the gantry 12 can move transversely with respect to the workpiece 10. Two movable platforms 14A, 14B are mounted on the beam 12A of the gantry 12. These platforms provide movement along path B–B' so that the platforms 14A, 14B can move longitudinally with respect to the workpiece 10. These platforms also provide vertical movement along path C–C' so that the heads 16A, 16B can be raised or lowered as necessary to inspect the workpiece 10, to avoid collision with the workpiece 10, or to perform a welding or other operation on the workpiece 10. The heads 16A, 16B are connected to the platforms 14A, 14B, respectively. The heads 16A and 16B preferably include both scanning devices and welding devices, not shown separately. The scanning device and the welding device in a head 16A, 16B may be independently operable or may be retracted or rotated so that the desired device is in operational position. In another embodiment, only one device is included in the head 16A, 16B and the devices (scanning device, welding device) are switched whenever necessary.

The welding operation has been discussed in detail in the related patent application mentioned above. In the preferred embodiment, a head 16 for scanning is a television camera which has automatic focusing. Such cameras are readily commercially available and cost less than laser scanning systems. Thus, for clarity of discussion hereinbelow, the heads 16A and 16B will be referred to primarily as cameras hereinafter. Lighting is of some importance because cameras are used. Natural lighting (sunlight) may be adequate in most cases, especially if the workpiece is outdoors. However, if the workpiece is indoors, or if the natural lighting is poor because of the weather or because of the time (e.g., nighttime), then supplemental lighting should be provided to eliminate shadowing.

In one method of implementing the present invention, the gantry 12 is positioned at a first point along path A–A', the platform 14A is positioned at the outermost point (B) of path B–B', which causes the platform 14B to be positioned at the midpoint of path B–B', the cameras 16A and 16B are aimed at a first point, and then the measurements for the workpiece 10 are made. Then, the cameras 16A and 16B are aimed at a second point and the measurements are made. Then, the cameras 16A and 16B are aimed at a third point and the measurements are made.

This process is repeated until a limit is reached, such as the end point of a degree of freedom of a camera 16, or the edge of the workpiece 10. Then, a different, second degree of freedom is adjusted and the process is repeated for that different degree of freedom. Then, when the limits for both degrees of freedom, a third degree of freedom is adjusted and the process is repeated. This continues until the all degrees of freedom have been used or the entire workpiece has been scanned. This provides information concerning the location, height and curvature of the bottom plate 10A, the transverse I-beams 10B, and the longitudinal I-beams 10C.

It will be appreciated that scanning straight down does not provide information about whether the beams 10B, 10C are I-beams, inverted L-beams, or inverted U-beams, so the welding points (the points of contact between the beams 10B, 10C and the bottom plate 10A) are not yet known. Therefore, to obtain additional information, the cameras 16A and 16B are positioned at an angle so that they view the sides of the beams 10B, and then the scanning process is performed. The cameras 16A and 16B can also be extended linearly to obtain the desired viewing angle. However, the heights of the workpiece elements should be determined first so that collision between the cameras and the workpiece can be avoided. The platforms 14A, 14B are moved in one direction, say B'. In the scanning process, one method is to rotate the cameras 180° when the end of the path is reached, so that the opposite side of the elements 10B can be viewed by the cameras, and then the scanning process is repeated while the platforms 14A, 14B are moved in the opposite direction, B. Thus, complete information is obtained for the beams 10B.

Then, the cameras 16A and 16B are rotated clockwise/counterclockwise so that they can view the sides of the beams 10C, the platforms 14A, 14B are placed at a first point along path B–B', the gantry 12 placed at a first point along path A–A', say toward the A end of path A–A', and then the scanning process is repeated while the gantry 12 is moved, in this case in the direction of A'. Again, the cameras 16A and 16B can also be extended linearly to obtain the desired viewing angle because the heights of the workpiece elements have already been determined and therefore collision with the workpiece is easily avoided. When the end of the path is reached then the cameras are rotated 180°, so as to view the opposite side of the elements 10C, and then the scanning process is repeated while the gantry 12 is moved in the opposite direction, A. Then, the platforms 14A, 14B are positioned at a second point along path B–B', slightly to one side of the first point, and then the process of moving the gantry 12 is repeated. This procedure is repeated until the entire workpiece 10 has been scanned. Complete information is now known about the beams 10C.

This procedure thus provides accurate information concerning the location, height and curvature of the bottom plate 10A, the transverse I-beams 10B, and the longitudinal I-beams 10C.

If desired or necessary, additional information may be obtained by positioning a camera close to or even inside a compartment 10D. This is possible because information has already been obtained about the location of the compartments 10D because the location and positioning of the elements 10B, 10C have been determined.

Therefore, it is possible, by virtue of the present invention, to obtain complete information about the configuration of the workpiece 10. Of course, the workpiece can be scanned using procedures other than the linear scanning technique described above. However, the particular scanning technique used should obtain enough information so that the configuration can be determined for the particular area or areas of the workpiece where a subsequent operation is to be performed. The configuration information is then provided to the welding program which controls the robotic welders, and the welding program can then precisely position the robotic welders for the welding operation to be performed. Thus, errors in the CAD design information or in the positioning of the elements during assembly are of little or no consequence because the actual configuration (positions of the various elements) have been determined. The welding operations are then performed using this actual configuration information.

For convenience of illustration, FIG. 1 shows only one gantry 12 and two platforms 14. However, it should be appreciated that more than one gantry may be used, and more than two platforms and cameras may be used, to obtain information more rapidly, provided that measures are taken to avoid collision between the several gantries and platforms. For example, one pair of cameras may provide information about one half of the workpiece 10, and another pair of cameras may provide information about the other half of the workpiece 10, so that the two pairs collectively provide information about the entire workpiece 10. The use of multiple pairs of devices increases the number of cameras but decreases the actual scanning time. The output of the cameras may be communicated to the controller by any convenient means, such as analog or digital transmission, and via conventional or fiber optic cable.

The ranging information allows a complete three dimensional picture of the object (X coordinate of a point, Y coordinate of a point, and height (Z coordinate) of a point) to be determined. Once this three dimensional information has been obtained and processed to form an electronic representation of the object then the representation of the object may be rotated electronically so that the object, and the features of the object, may be viewed and from any desired angle. Computer programs for rotating three dimensional representations of objects are well known.

"Targets", such as reflectors, mirrors, or point light sources, may be placed at specified points on the workpiece, such as the corners and upper and lower edges. These targets may be used to mark the outer limits of the workpiece, verify the accuracy of the measurement systems, or provide a compensation factor for any offset or error in the measurement systems.

Figure 2:
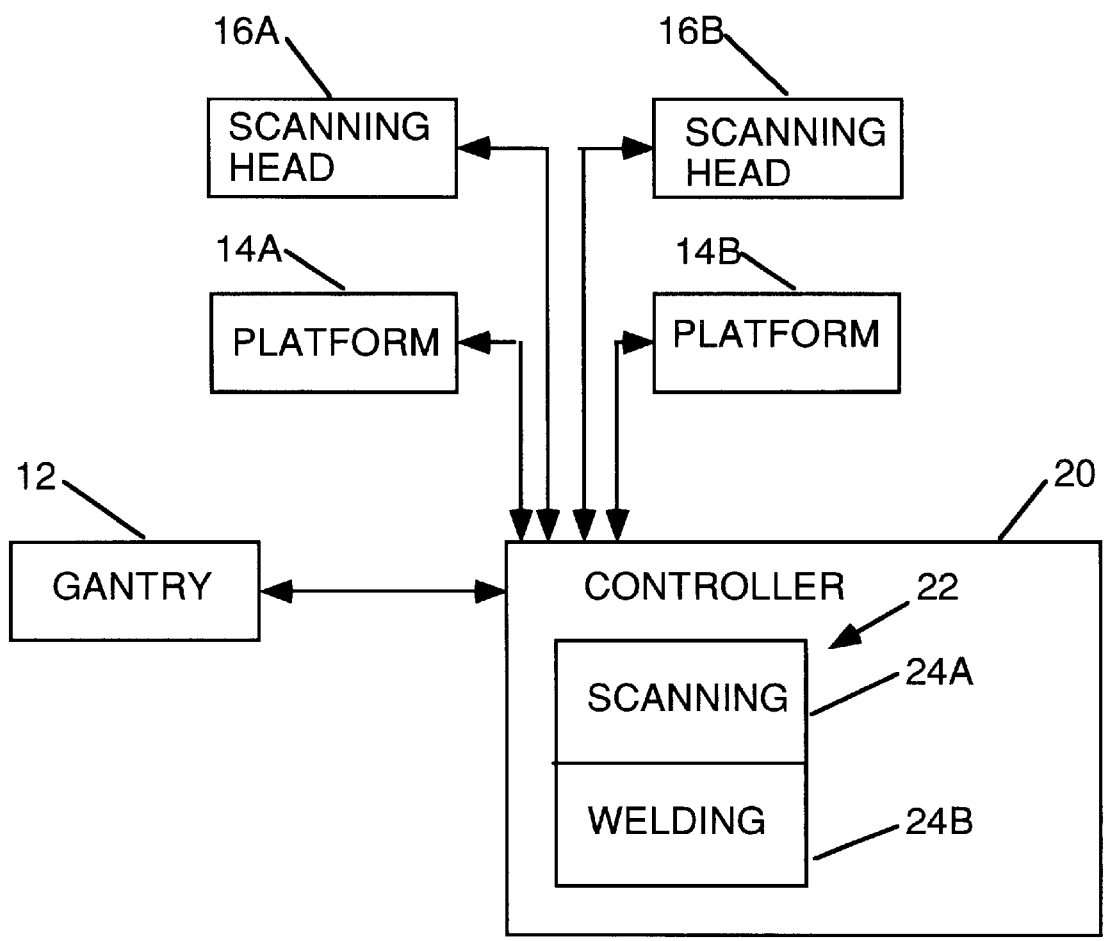
FIG. 2 is a block diagram of the present invention.

FIG. 2 is a block diagram of the present invention. A controller 20 controls the operation of system. The controller 20 performs two distinct operations: scanning and welding. A memory 22 has a first program section 24A which contains programming instructions for the scanning operation, and a second program section 24B which contains programming instructions for the welding operation. Preferably, the program section 24A concerned with scanning also interprets the scanning data to provide the information needed for the program section 24B. The scanning process is described herein. The process of interpreting data from a scan to produce an image or a three-dimensional model of the object which has been scanned is well known, such as in magnetic resonance imaging, CAT scans, synthetic aperture radar, etc. The process of welding based upon information about the configuration of a workpiece is described in U.S. patent application Ser. No. 08/368,705, filed Jan. 4, 1995, entitled "Method for Simultaneous Operation of Robot Welders". Other procedures may also be used.

The controller 20 is connected to the gantry 12, sends positioning instructions to the gantry 12, and receives positioning information or position confirmation from the gantry 12. Thus, the controller controls the gantry 12 and knows the exact location of the gantry 12 at all times. The controller 20 is also connected to the platforms 14A and 14B, sends positioning instructions to the platforms 14A and 14B, and receives positioning information or position confirmation from the platforms 14A and 14B. Thus, the controller 20 controls the platforms 14A and 14B and knows the exact location of the platforms 14A and 14B at all times. The controller 20 is also connected to the cameras 16A and 16B, sends positioning instructions to the cameras 16A and 16B, and receives positioning information or position confirmation from the cameras 16A and 16B. Thus, the controller 20 controls the cameras 16A and 16B and knows the exact location of the cameras 16A and 16B at all times. The controller 20 also sends scanning instructions to the cameras 16A and 16B and receives the video data and ranging information from the cameras 16A and 16B. The controller 20 thus knows the exact position of the gantry 12, the exact position of the platforms 14A and 14B, and the exact position of the cameras 16A and 16B, and so the controller 20 can verify that the ranging information is for an actual position on the object (workpiece 10). The determination of the exact position of each observed point, based upon the positions of the gantry, platforms, and cameras and the ranging information is referred to herein as registration. Therefore, the controller 20 constructs an image or model of the object based upon the ranging information and the position information for the observed points.

Figure 3:
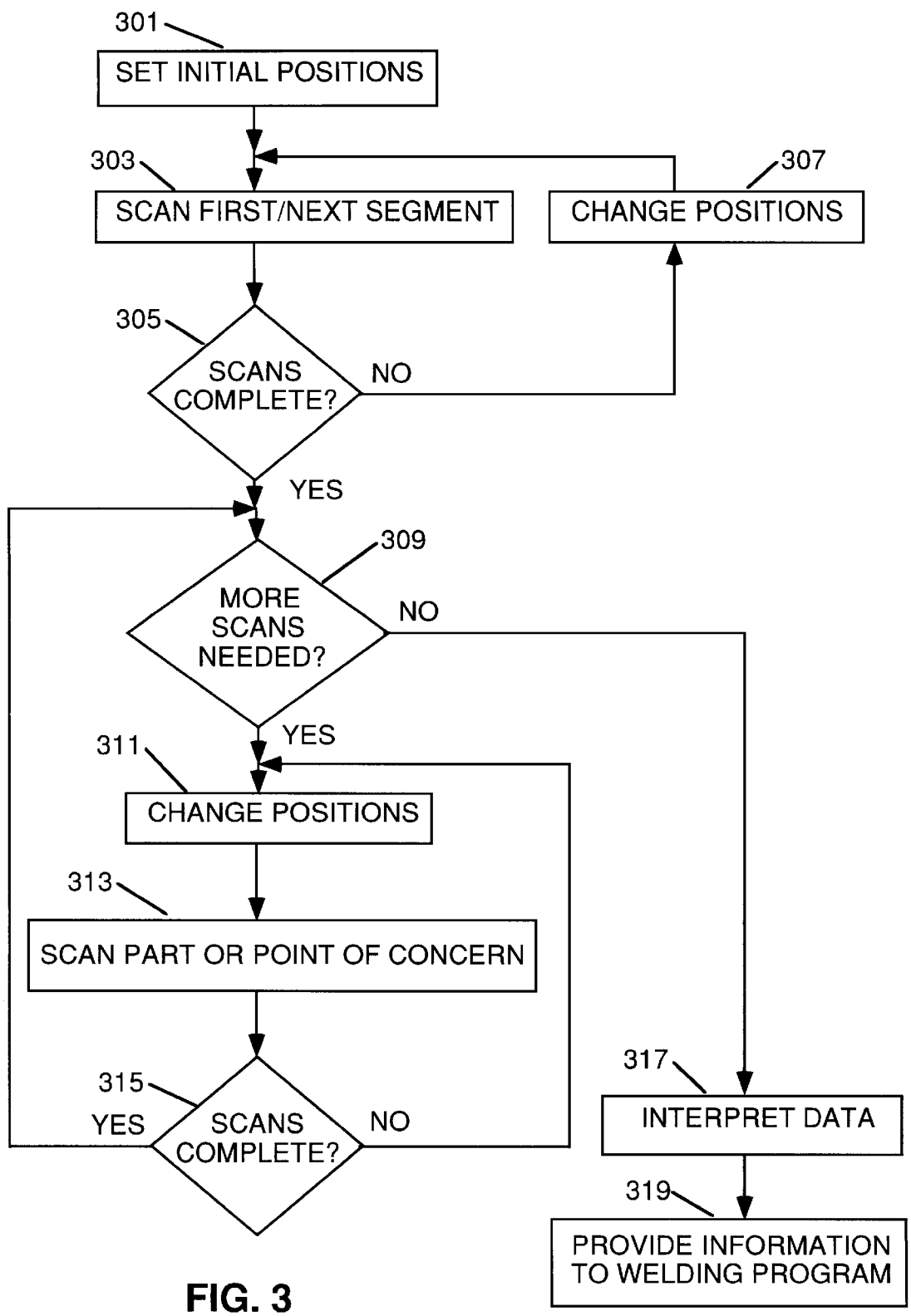
FIG. 3 is a flow chart illustrating the process of the present invention.

FIG. 3 is a flow chart illustrating the process of the present invention. The first step 301 is to set the initial positions for the gantry 12, the platforms 14A and 14B, and the cameras 16A and 16B. If the workpiece 10 is on a movable table (not shown) then the workpiece 10 is also moved to its initial position.

In step 303 the first segment of the workpiece is scanned. In the preferred embodiment, scanning is performed on a segment-by-segment linear basis, as described above. However, other scanning procedures, such as spirals, may be used if desired.

In step 305 the controller 20 determines whether the first set of scans has been completed. If not, then in step 307 the controller changes the position of the appropriate device or devices (gantry 12, platform 14A, 14B, camera 16A and 16B) and then returns to step 303 to scan the next segment.

If, in step 305, the first set of scans has been completed then, in step 309, the controller 20 determines whether additional sets of scans are needed. This determination may be made simply, as where the controller 20 is programmed to perform two or more scans unconditionally, or may be made based upon the results of the previous set or sets of scan data.

For example, the controller 20 may process the data from the first set of scans and detect abrupt differences in height data, which indicate that compartments are present, or may detect that some observed points have been marked as possibly being erroneous or invalid. In this case the controller 20 determines that one or more additional scans is needed. For example, the interiors of the compartments may need to be scanned to determine the configuration of the compartments, or certain points may need to be scanned again, with the cameras being at different positions, to determine whether the point of concern is a part of the workpiece or not. Controller 20 will then position the appropriate device or devices to provide for the additional scanning.

If, in step 309, one or more additional sets of scans are required then, in step 311, the controller 20 changes the position of the appropriate device or devices. In step 313 the next set of scans is started. In the preferred embodiment, step 313 is to scan the part or point of concern, such as the interior of a compartment, or an observed point where the position information is possibly erroneous or invalid.

In step 315 the controller 20 determines whether this set of to scans has been completed. If not then the controller 20 returns to step 311, changes the position of the appropriate device or devices, and performs the next scan in step 313.

If, in step 315, this set of scans has been completed then a return is made to step 309 to determine if another set of scans is needed. If so then step 311 is executed.

If no additional sets of scans are needed in step 309 then, in step 317, the controller 20 completes the interpretation of the data and, in step 319, the controller 20 furnishes the interpreted information to the welding process.

Once the information has been sent to the welding process the scanning process has been completed. At this point, if necessary, the cameras may be retracted, rotated, or replaced, so that the welding heads are in position. The welding process is then initiated.

The sequence of operation described above, scanning the workpiece or portion thereof, and then performing the welding or other operation, is a preferred method of operation but the present invention is not so limited. In another embodiment of the present invention, the scanning operation and the desired operation are performed essentially simultaneously. In this embodiment, an area is scanned and then the desired operation is performed on that area, then the next area is scanned, and so on. For example, the cameras 18 are used to scan a first area and a second area of the workpiece 10, the information on the first area is processed, and the desired operation is commenced on the first area. While the desired operation is being performed on the first area, the information on the second area is being processed. When the operation on the first area is completed, a third area is scanned and then the desired operation on the second area is commenced while the information on the third area is being processed, and so on.

The controller 20 then uses the collected information (position information, ranging information) to calculate the exact position of each observed point. The position may be recorded as X, Y, Z axis position information. The position may also be recorded using other coordinate systems, which are desired or convenient for the workpiece involved. The controller 20, depending upon its processing power, may determine the exact position for each observed point as the scanning process is proceeding and the information is collected for each observed point, or may determine the exact positions for all of the observed points after the scanning process has been completed and data has been collected for all desired observed points.

Once the position of each observed point has been determined, the controller 20 then inspects the position information to determine the configuration of the workpiece, as described in the related applications.

Figure 4A:
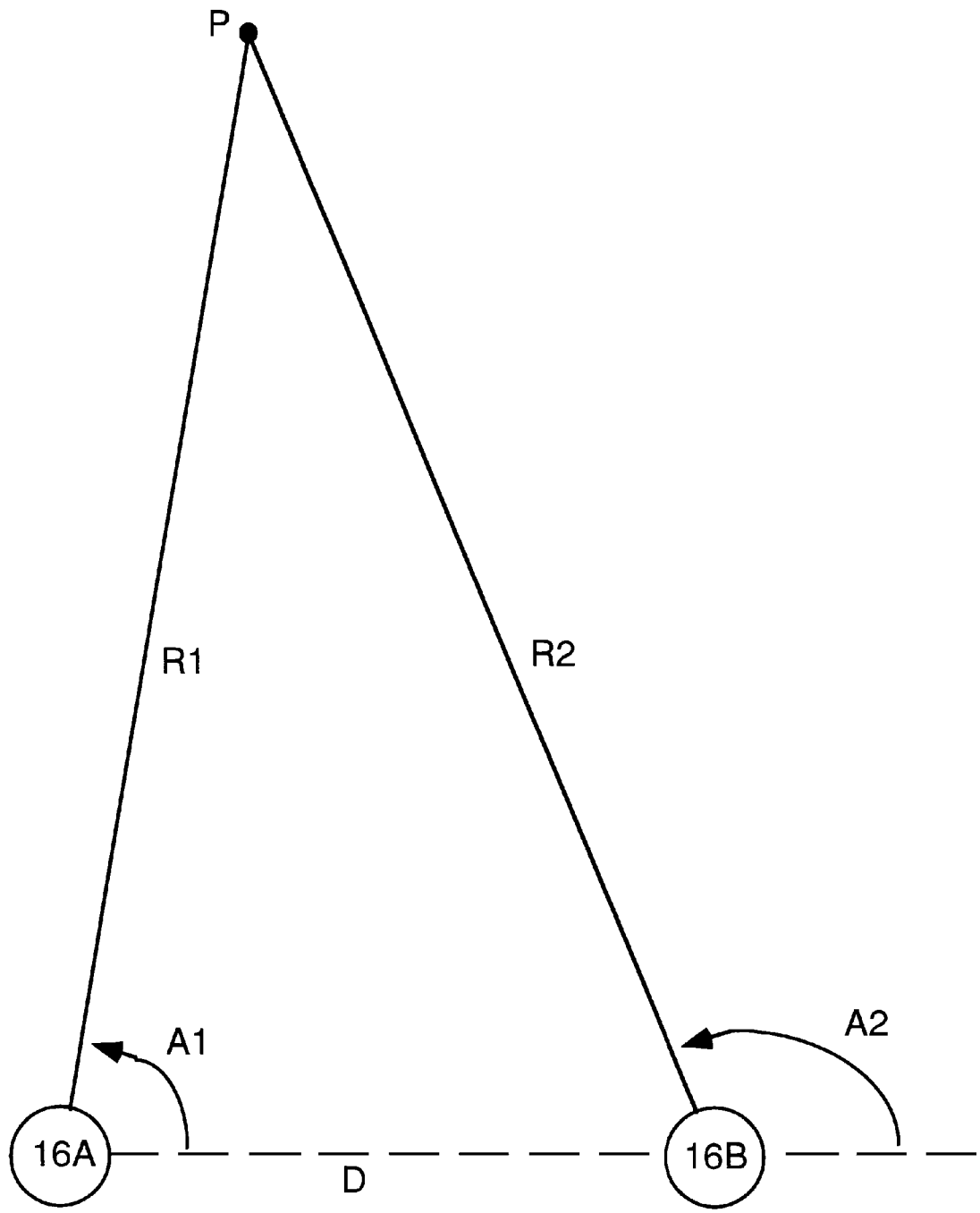
FIGS. 4A and 4B are a diagram of the camera positions and measurements.
Figure 4B:
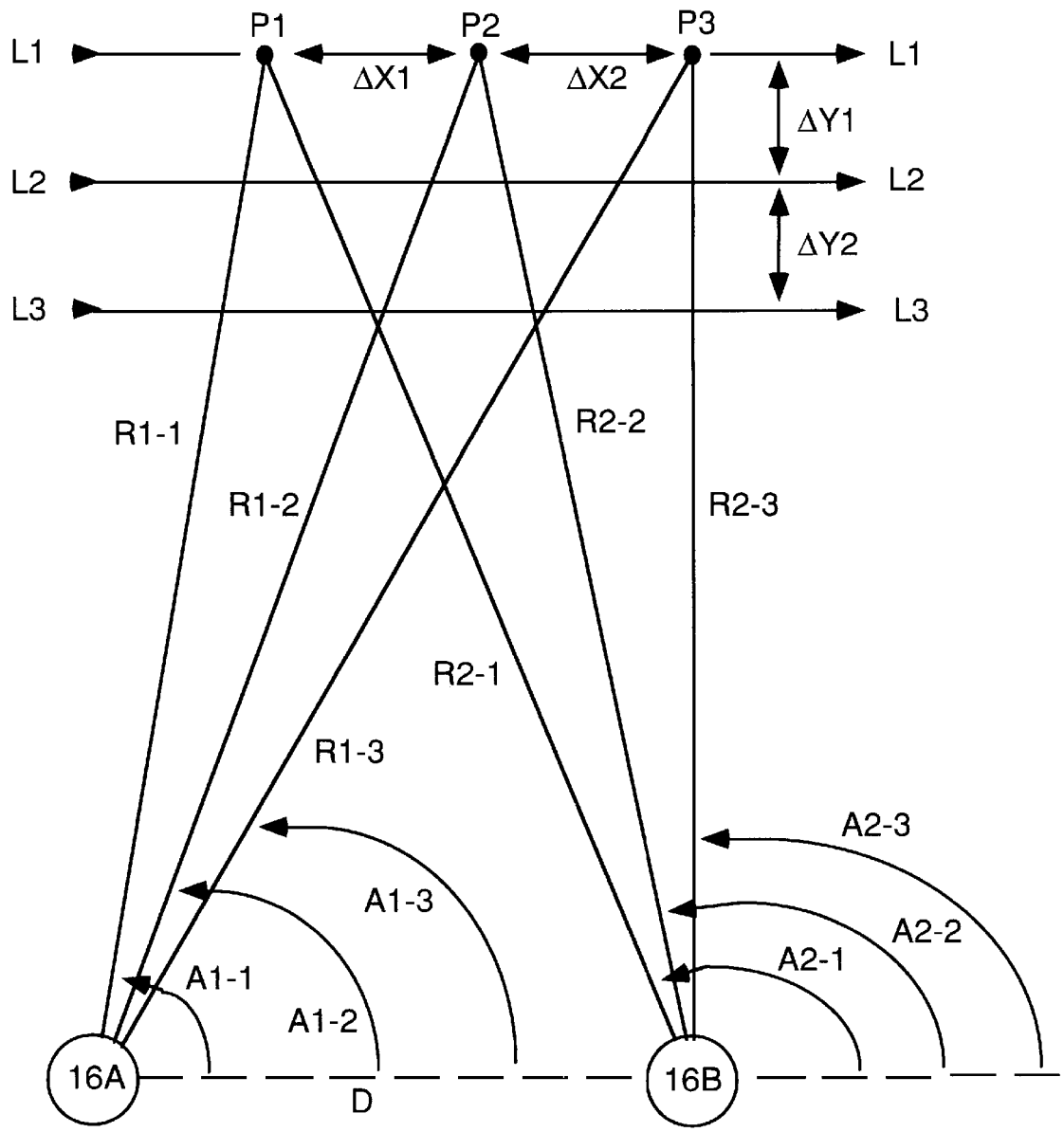

FIGS. 4A and 4B are a diagram of the camera positions and measurements. The cameras 16A and 16B are operated to view the same point P on the workpiece 10. This may be done by moving the cameras in coordination. This may also be done by moving the cameras independently and then consolidating the data points. In the preferred embodiment, the platforms 14A and 14B are physically connected and move in unison. By movement of the gantry 12 along path A–A', by movement of the platforms 14A, 14B along paths B–B' and C–C', and by movement of the cameras 16A and 16B along their degrees of freedom, the cameras 16A and 16B can view each and every element of the workpiece 10 in detail and without any element being completely concealed by any other element. Thus, in conjuction with the mechanisms mentioned above, the cameras 16A and 16B have several degrees of freedom, such as move linearly up/down, rotate clockwise/counterclockwise, rotate up/down, extend/retract linearly, etc.

In the preferred embodiment, the distance between the cameras 16A and 16B is a fixed distance D. The distance D between the cameras 16 may be a variable distance but this increases the complexity of the subsequent calculations and therefore the time needed to perform the subsequent calculations.

The cameras 16A and 16B operate as a stereoscopic vision device with automatic ranging. The two cameras are controlled to aim at the same point P, and the video output and the automatic ranging information from the cameras are captured. If there is a part of the workpiece 10 present at that point P then the video output will be pictures of the that part of the workpiece 10 as viewed by each of the cameras, and the ranging information will be the distance along the lines R1 and R2 from each of the cameras 16A and 16B, respectively, to that part. The video output and the ranging information are used to independently confirm the presence of a part of the workpiece 10 at the point of viewing.

The physical coordinates of the viewed point are determined by using the ranging information, the spacing between the cameras, and the camera position information. For example, FIG. 4A is a simplified illustration of the two cameras pointing toward a common point P. For convenience, only a two-dimensional situation is presented. However, the actual implementation is generally a three-dimensional situation, which differs only in that the calculations involve positioning information in three dimensions, rather than two, and that the location of a point is expressed in three dimensions, rather than two. In the example shown, the cameras 16A and 16B are separated by a distance D. The angles of rotation A1 and A2 of the cameras 16A and 16B, respectively, are also known, either by setting these angles or by measuring these angles. If a part of the workpiece is present, it must lie at the intersection point P of lines R1 and R2. The ranging information from the cameras 16A and 16B provides information as to where on lines R1 and R2 the part of the workpiece lies. Therefore, the position of this part of the workpiece can be determined based upon the information available. If the two cameras indicate that a part of the workpiece is present, and the position of this part, as determined independently from each camera, is the same, then this position is defined as an observed point.

Another way of obtaining the information is to cause the two cameras to scan independently. In this procedure the camera 16A is set to a first viewing angle A1. The camera 16A is then instructed to autofocus, and the position information, the ranging information, and the resulting video image are captured. The camera 16A is then set to a second viewing angle A1+Δ, instructed to autofocus, and the position information, the ranging information, and the resulting video image are captured. This process is repeated until camera 16A has completed scanning the workpiece. This results in a first set of observed points. This process is also performed with camera 16B, which results in a second set of observed points. The observed points from the two sets are compared. If an observed point in one set has a corresponding (same position) observed point in the other set, and if both video images are lighter, then this point is considered to be a valid observed point.

Regardless of the procedure used to obtain the position information, assume that the cameras are aimed at empty space, that is, the cameras are aimed at a point where there is no workpiece present, such as a hole in the bottom plate 10A of the workpiece 10. The automatic focusing feature of the cameras 16A and 16B will focus on some object beyond the plate 10A and will provide the distance to this object as the ranging information. Now, the position P as determined by the information from the camera 16A will not match the position P as determined by the information from the other camera 16B. Therefore, if the position P determined by using one camera does not match a position P determined by using the other camera then this observed point is marked as possibly having erroneous position information.

As an additional test, the video output of each camera is checked. If there is a portion of the workpiece at the point P of viewing then the video output will be a lighter picture because the workpiece will reflect light and this reflected light will be detected by the cameras. However, if the cameras are aimed at empty space, that is, the cameras are aimed at a point P where there is no workpiece present, such as a hole in the bottom plate 10A of the workpiece 10, then there will be little or no reflected light so the video output will be a darker picture. Therefore, if the output of a camera is a darker picture then this observed point is marked as possibly having erroneous position information.

Therefore, point in one set which does not have a corresponding point in the other set is marked as possibly being an erroneous observed point. Also, even if there is a corresponding point, if either video image is darker for either of the observed points then these points are marked as possibly having erroneous position information. Points marked as possibly having erroneous position information are preferably saved for inspection by a human operator. Alternatively, such points may be discarded, or may be saved but not used in further procedures.

FIG. 4B illustrates one method of scanning the workpiece. The cameras 16A and 16B are aimed, via control of angles A1-1 and A2-1, respectively, to point along lines R1-1 and R2-1, respectively toward a first point P1. The ranging information from the cameras is then captured and stored. If a part of the workpiece is present it will lie at the intersection point P1 of lines R1-1 and R2-1. The camera angles necessary to view a second point P2 are then determined, where point P2 is separated from point P1 by some specified distance, $\Delta X1$. The camera angles are then changed to A1-2 and A2-2 to point along lines R1-2 and R2-2, which intersect at point P2. The camera angles necessary to view a third point P3 are then determined, where point P3 is separated from point P2 by some specified distance, $\Delta X2$. The camera angles are then changed to A1-3 and A2-3 to point along lines R1-3 and R2-3, which intersect at point P3. The separation distances $\Delta X1$ and $\Delta X2$ are preferably the same but may be different. This is repeated until the workpiece has been scanned along line L1. Then, new camera angles are determined to cause the cameras to view points (not shown) of the workpiece which are line L2, line L2 being separated from line L1 by some specified distance, $\Delta Y1$. Scanning is then performed along line L2, then along line L3, line L3 being separated from line L2 by some specified distance, $\Delta Y2$. The separation distances $\Delta Y1$ and $\Delta Y2$ are preferably the same but may be different. This is repeated until the workpiece has been scanned. The cameras are then moved to a different position, if necessary, to obtain information from a different observation point, such as the other end of the workpiece.

Figure 5A:
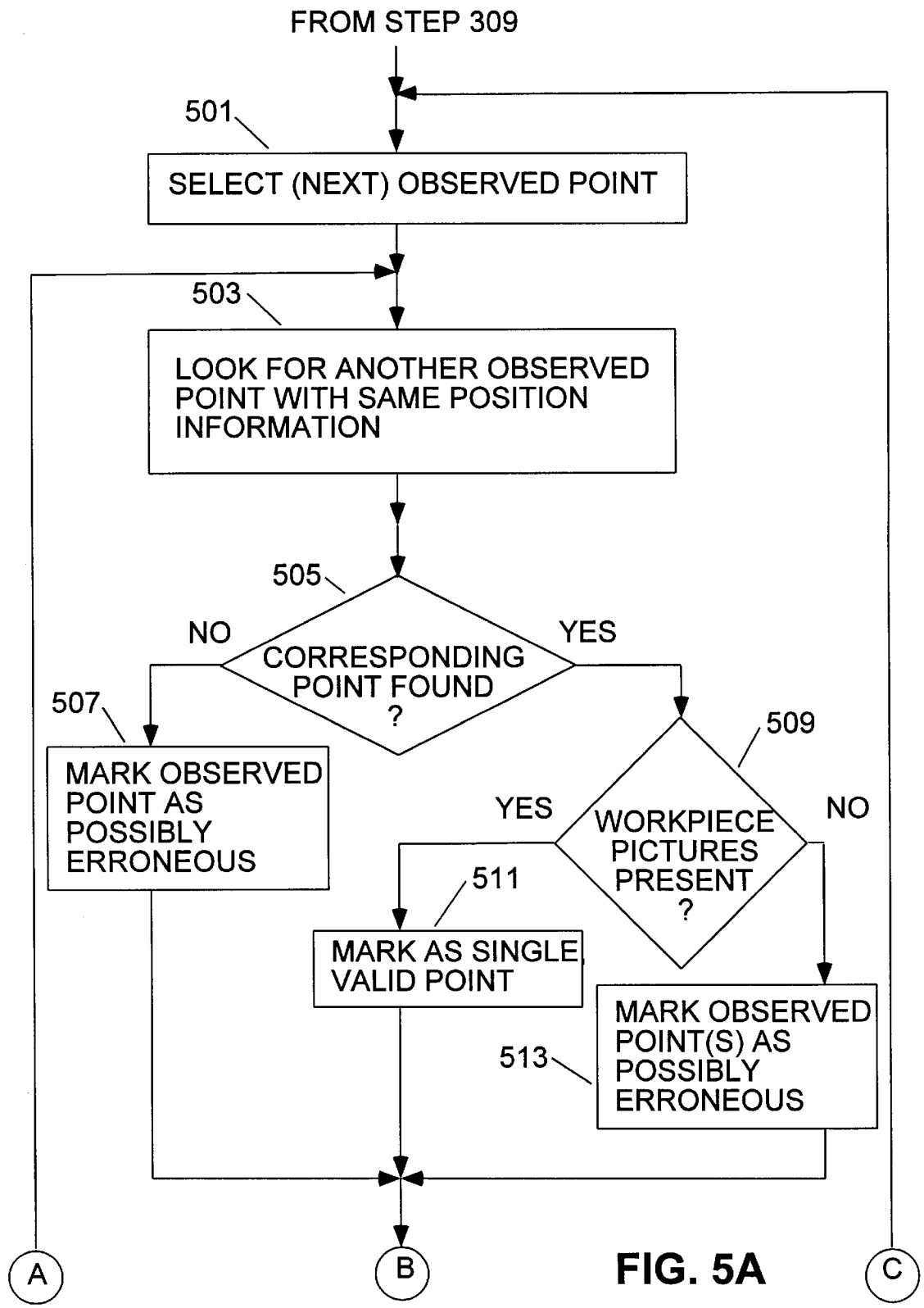
FIGS. 5A and 5B are a flow chart illustrating the process of the verifying the position information for the observed points.
Figure 5B:
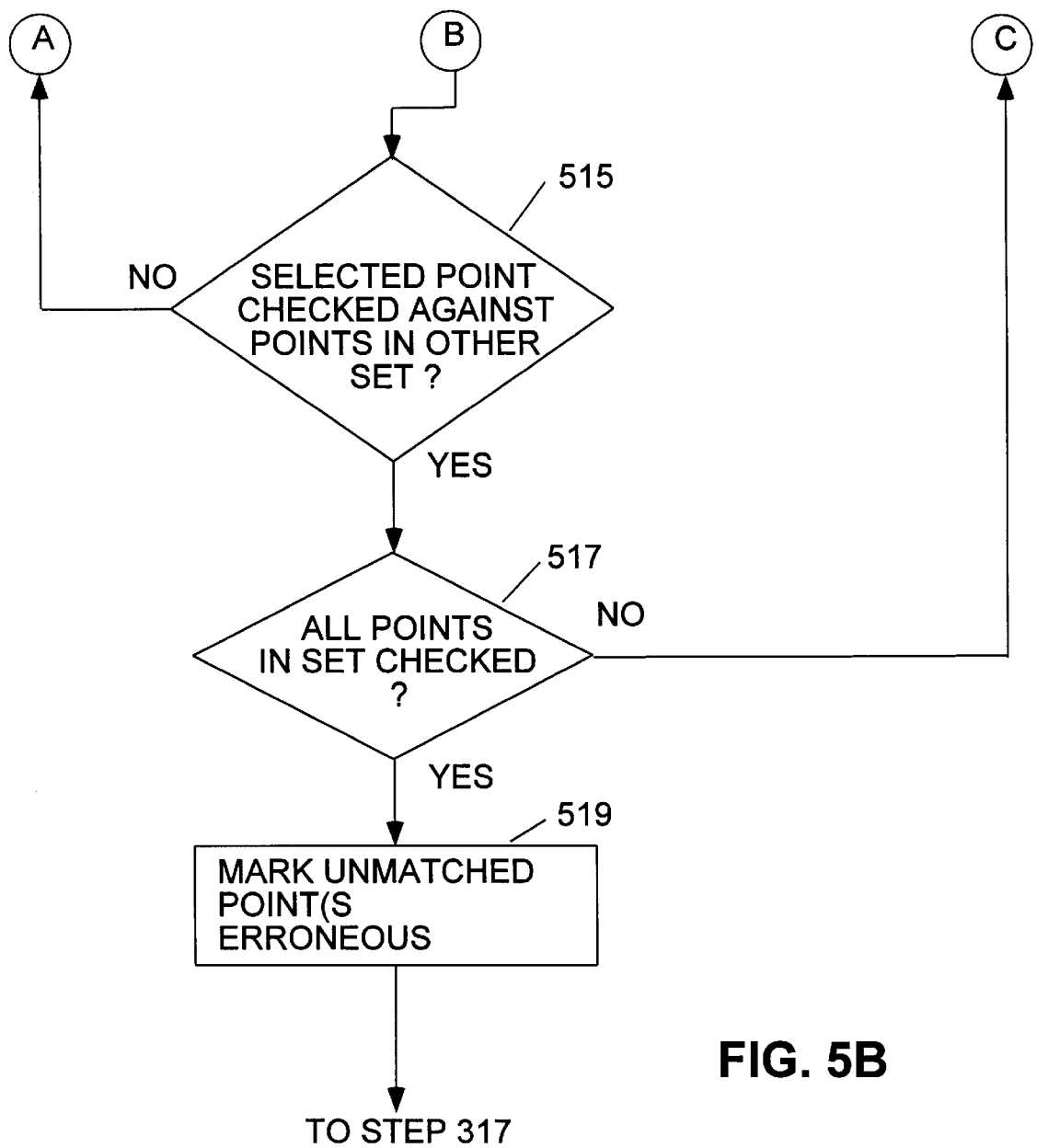

FIGS. 5A and 5B are a flow chart illustrating the process of the verifying the position information for the observed points. This process involves looking for a corresponding observed point and testing the brightness of the picture. This is preferably performed as part of the "interpret data" step 317. In step 501 the controller selects an observed point in one set of observed points and in step 503 searches the other set of observed points for a corresponding point, that is, a point with the same position information.

Step 505 tests whether a corresponding point has been found. If not, then in step 507 this selected point is marked as possibly being an erroneous observed point, and then step 515 is executed. If, at step 505, there is a corresponding point, then step 509 tests whether the selected observed point and the corresponding point are both pictures of the workpiece, such as by testing the brightness of each picture. If one (or both) of these pictures is not a picture of the workpiece then that point (or both points) is marked in step 513 as possibly being an erroneous observed point, and then step 515 is executed.

If both the selected point and the corresponding point are pictures of the workpiece then, in step 511, these points are labeled as a single, valid, observed point, and then step 515 is executed.

Step 515 tests whether the selected observed point has been tested against all the points in the other set. If not, then a return to step 503 is made and the rest of the points in the other set are searched for a corresponding point. If the selected observed point has been tested against all the points in the other set then step 517 is executed.

Step 517 tests whether all of the points in one set have been tested for corresponding points in the other set. If not then a return is made to step 501 and the next observed point is selected. If all of the points in one set have been tested then step 519 marks any remaining, unmatched observation points in the other set as possibly having erroneous position information. The process then continues with step 317.

Therefore, all of the points in one set have been testing for corresponding points in the other set, have been tested for the presence of the workpiece in the picture, and have been marked as valid, and therefore useful for the welding process, or have been marked as possibly having erroneous position information. Observed points in any set which have been marked as possibly having erroneous position information may be discarded, saved but not used, or presented to an operator for review and independent determination as to whether any such point has valid data. For example, a picture of a darker section or a shadowed section of the workpiece may fail the brightness test, but a human operator may be able to verify that the picture is valid and then mark the point as valid and useful for the welding process.

Figure 6A:
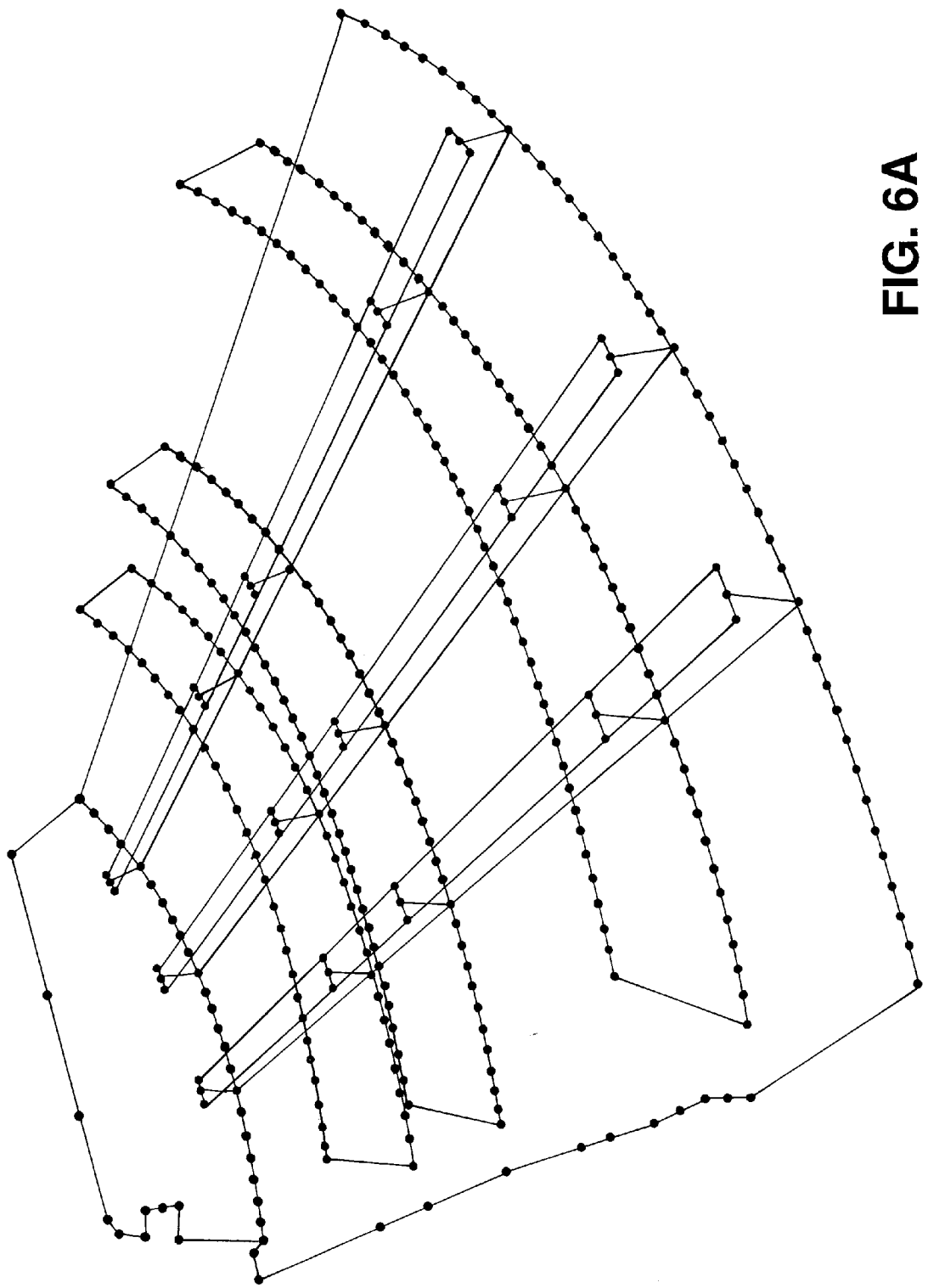
FIG. 6A illustrates an initial identification of the components represented by the valid observed points.
Figure 6B:
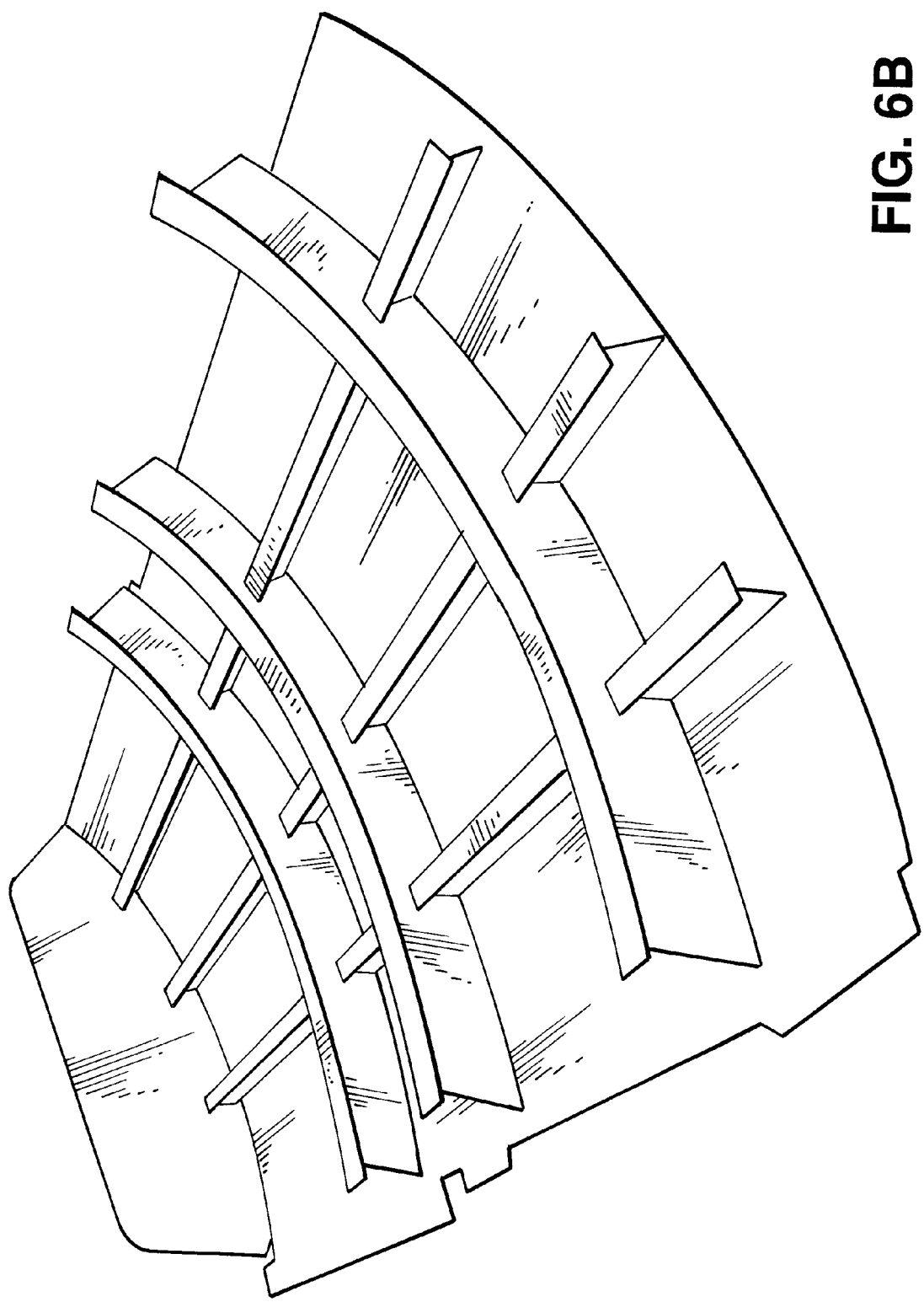
FIG. 6B illustrates the results of the identification of the components represented by the valid observed points.
Figure 7A:
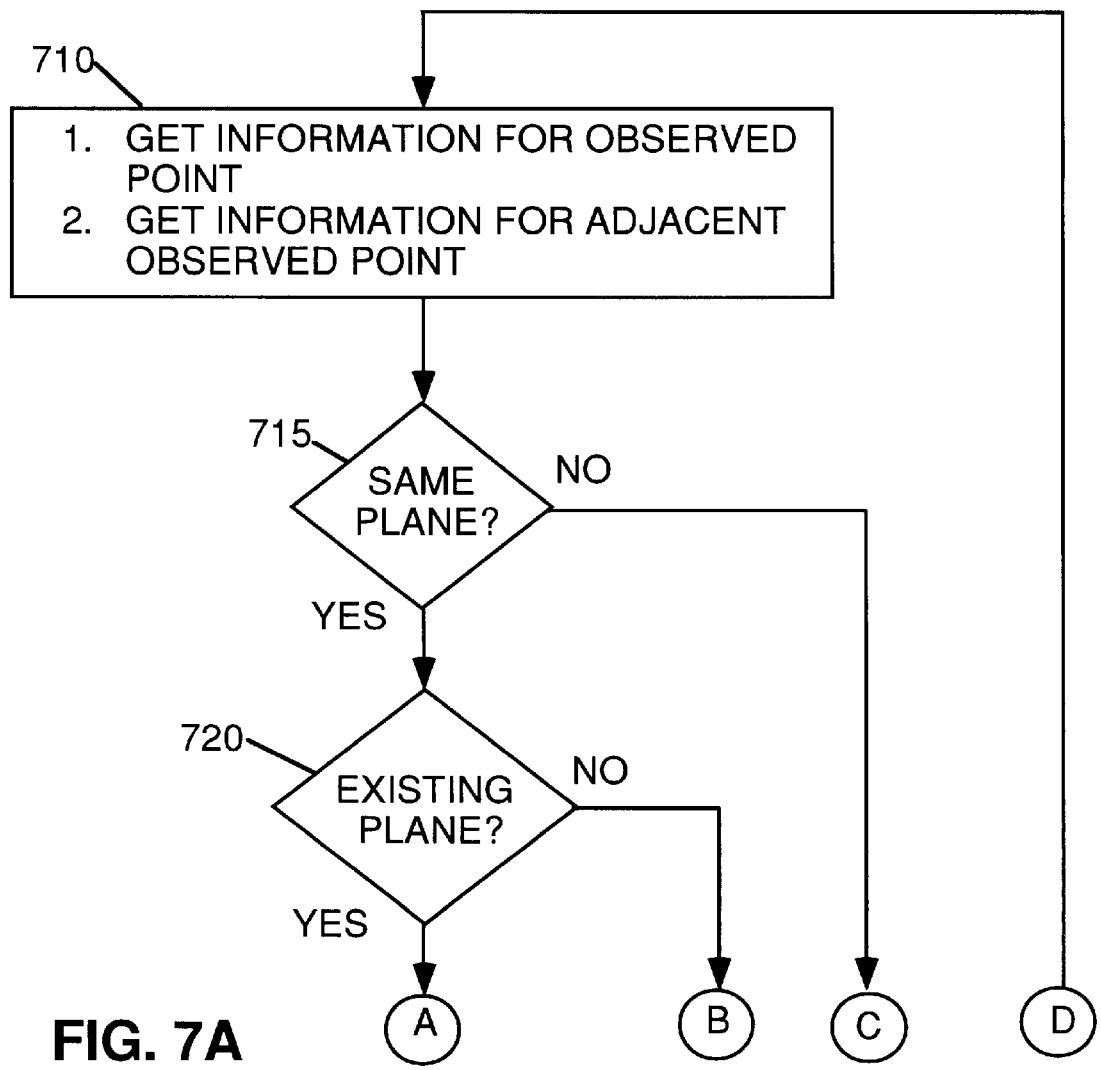
FIGS. 7A–7D are a flowchart of the data reduction operation.
Figure 7B:
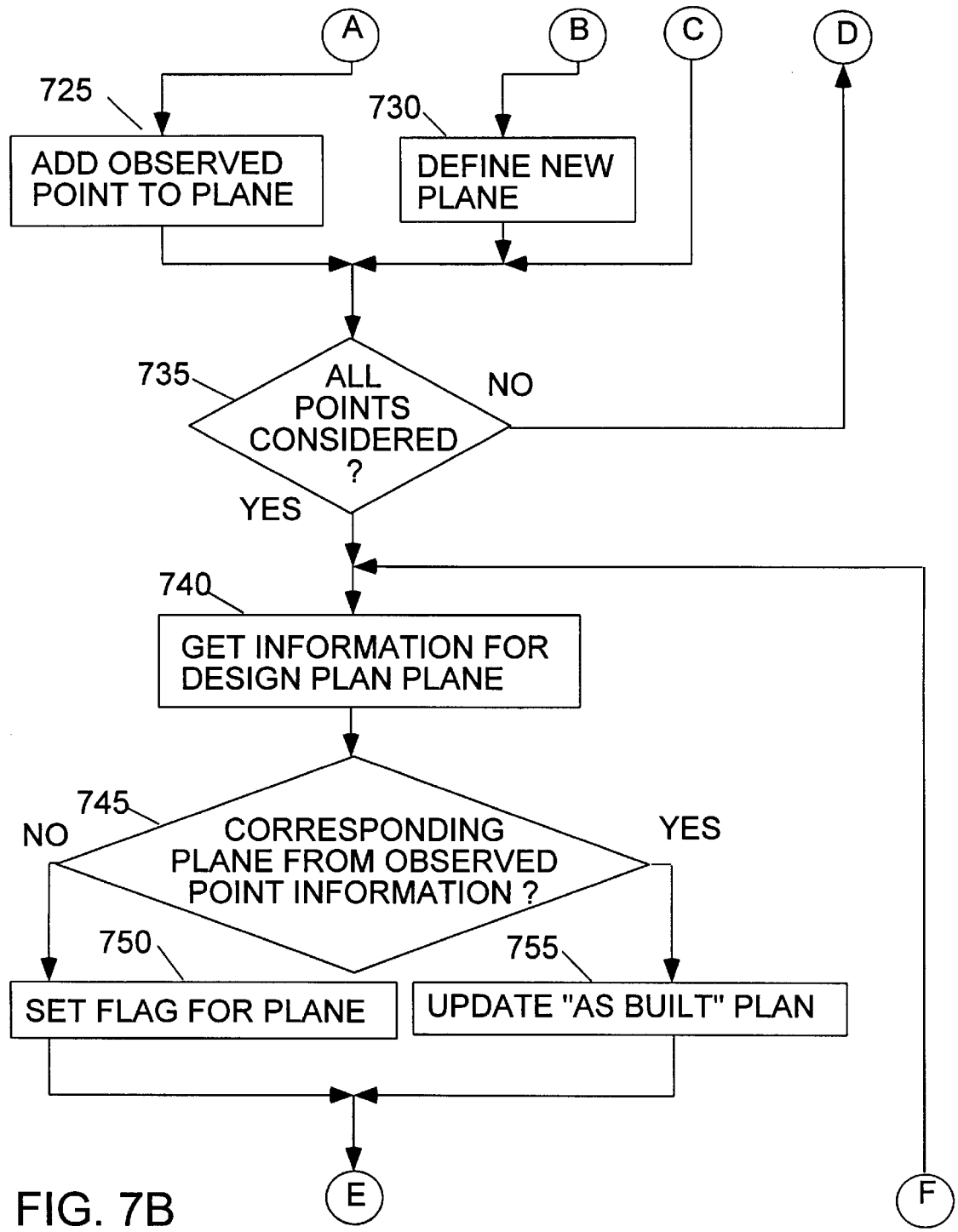
Figure 7C:
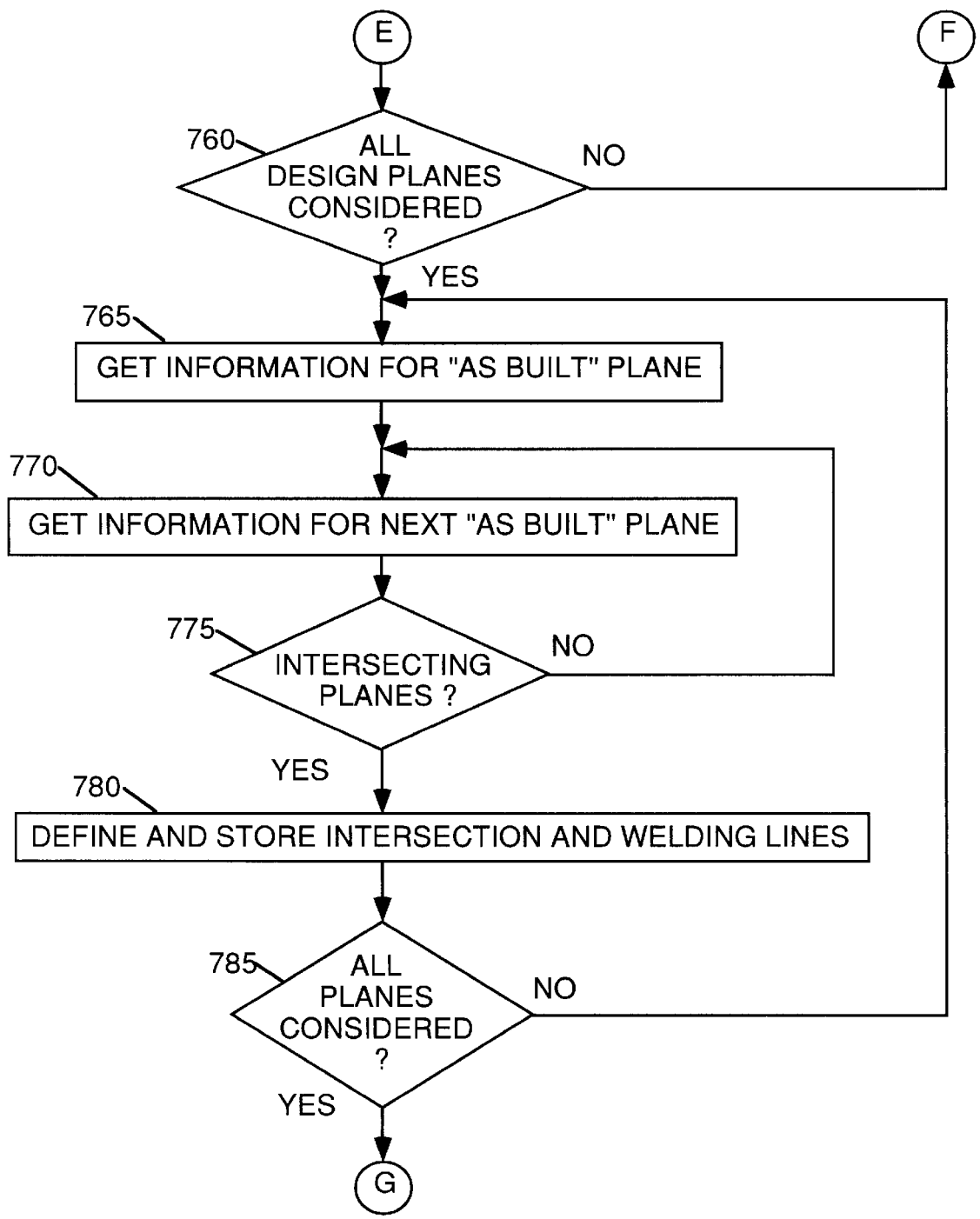
Figure 7D:
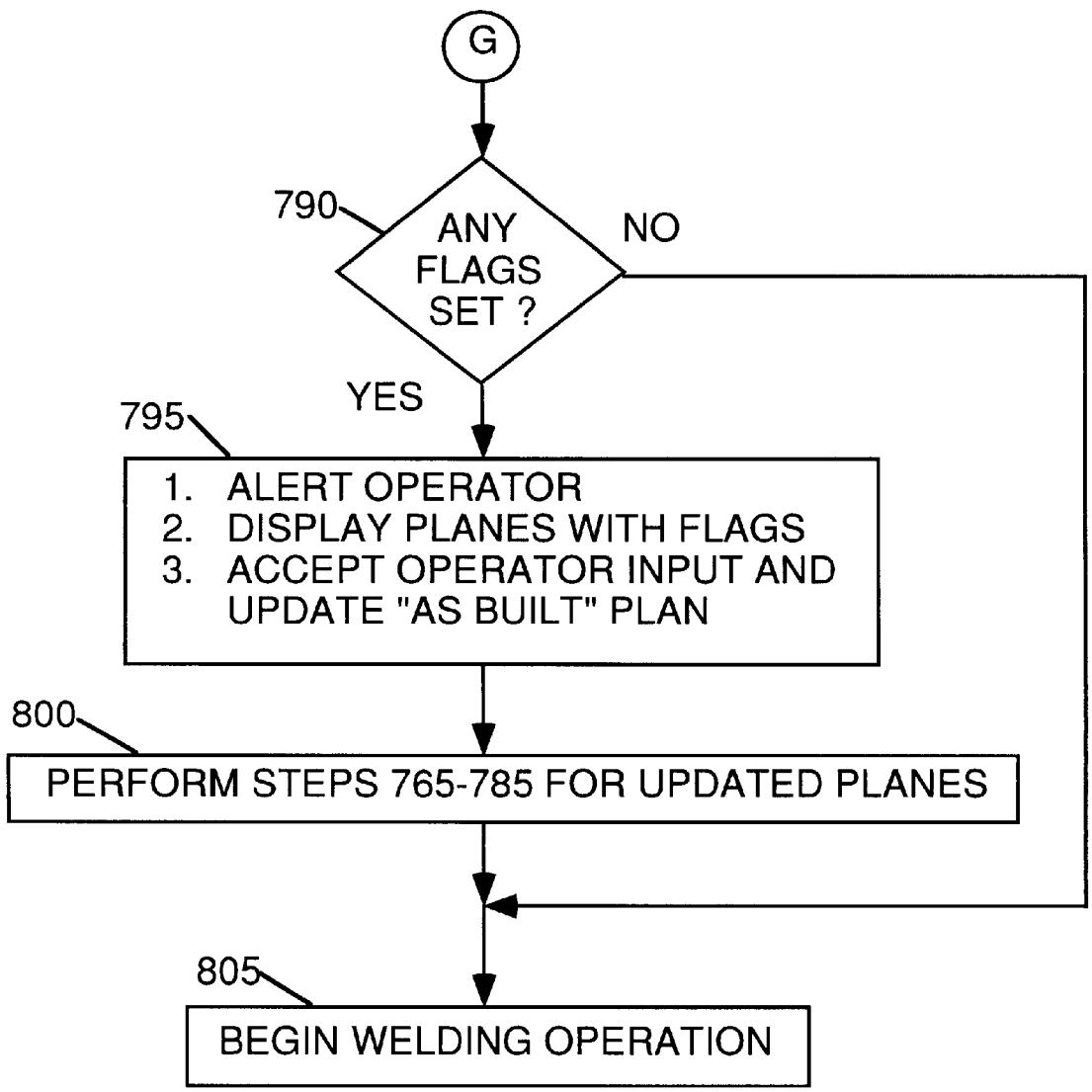

FIGS. 6A and 6B illustrate the identification of the components represented by the valid observed points. FIG. 6A is an initial identification of the components represented by the valid observed points. FIG. 6A is a simplified view and does not show all of the observed points used to identify the components. It will be seen from FIG. 6A that the general shape, position, and orientation of the components has been determined. Further processing of the observed points generates more details regarding the components.

FIG. 6B illustrates the results of the identification of the components represented by the valid observed points. However, at this point, there has not been a determination whether the different planes represent different components or different surfaces (top, side) of the same component. To resolve this, information about the components is required. This may be in the form of human input whereby a human operator views the display and indicates surfaces which are part of the same component. In the preferred embodiment, the information is used to update the design workpiece plans. The design workpiece plans represent the ideal location of each of the components. However, the actual placement of the components is typically not exactly in accordance with the design workpiece plans. If the components are placed in accordance with the design workpiece plans, or closely thereto, the design workpiece plans will provide information which is sufficiently accurate to allow for the robotic welder to use the touch-sense feature to determine the exact intersection where the components are to be welded. However, if the parts are not placed sufficiently close to the design workpiece plans, then the touch-sense feature may not be usable. The present invention therefore uses the information derived from the observed points to update the design workpiece plans to provide an "as built" workpiece plan. The "as built" workpiece plans then provide accurate information which allows the touch-sense feature to operate properly.

The design workpiece plans identify the individual components and also specify the preferred size, location and orientation of the individual components. The controller 20 uses this information to determine the surfaces of the individual components. The controller 20 then matches surfaces from the design workpiece plans to the surfaces determined by the observed points to determine the "as built" locations of the components. This "as built" information is then used to update the design workpiece plans to identify the exact location of the components to provide the "as built" workpiece plan. The "as built" workpiece plan now contains exact information regarding the size, location and orientation of the individual components. The controller 20 then uses the "as built" workpiece plans to perform the specified welding operations.

The step size between the measurements in the scanning process determines the accuracy of the identification of the component surfaces and the size, location and orientation of the individual components. A smaller step size yields more accurate information but increases the scanning time, the amount of data that the controller 20 must process, and therefore the processing time to develop the "as built" workpiece plans. A larger step size decreases the amount of data that the controller 20 must process, and therefore the processing time to develop the "as built" workpiece plans, but also yields less accurate information regarding the accuracy of the identification of the component surfaces and the size, location and orientation of the individual components. Thus, a smaller step size leads to more accurate "as built" workpiece plans but delays the availability of the plans, and a larger step size leads to quicker availability of the "as built" workpiece plans, but the accuracy of the placement of the components suffers. In the preferred embodiment, the step size is 6 inch spacing ($\Delta X$, $\Delta Y$) between the points.

FIGS. 7A–7D are a flowchart of the data reduction operation whereby the information on the valid observed points is used to determine the "as built" configuration of the workpiece. These steps are performed by the controller 20, preferably as part of step 317 and after steps 501–519.

Step 710 retrieves the position information for an observed point and for an adjacent observed point. Step 715 tests whether the observed point and the adjacent observed point are in the same plane. If not, then step 735 is executed. If so, then step 720 tests whether this plane is an existing, previously defined plane. If so, then step 725 adds this observed point to the existing point. Then step 735 is performed. If, at step 720, this plane is not an existing plane, then in step 730 a new plane is defined. Then step 735 is executed.

Step 735 tests whether all observed points have been considered. If not, then step 710 is executed. If so, then step 740 is executed.

At this point, the "as built" planes have been determined from the observed point information. These planes may be presented to a human operator for matching to the planes in the design workpiece plans. However, in the preferred embodiment, this is performed automatically. Therefore, in step 740, the information for a plane is obtained from the design workpiece plans. Step 745 tests whether there is a corresponding plane based upon the observed point information. This is done by, for example, comparing the size, orientation, and center point of planes from the design plans with the same information for planes from the observed point information. The two planes which most closely match are defined as corresponding planes. The design workpiece plan is then updated in step 755, using the exact coordinates of the corresponding plane based upon the observed point information, to generate an "as built" workpiece plan. Then step 760 is executed.

If, at step 745, there is no corresponding plane information then a flag is set in step 750 for that plane which marks that plane for further inspection. Then step 760 is executed.

Step 760 tests whether all of the design planes have been tested. If not, then a return is made to step 740. If so, then step 765 is executed.

It should be appreciated for steps 740 through 760, that an alternative method is to test each plane defined from the observed point information to determine if there is a corresponding plane in the design workpiece plan and, if not, to mark the unmatched plane from the observed point information for further inspection. Also, these steps could also test to determine whether any plane in either group has not been matched and set a flag for any unmatched plane.

It should also be appreciated that the design workpiece plan may not be available for comparison with the measured information. In this case, steps 740–760 are omitted and the process jumps from step 735 to step 765 and continues using only the measured information.

Step 765 begins the process of using the "as built" workpiece plan information. In step 765 the information for an "as built" plane is obtained. Step 770 obtains the information for another "as built" plane. Step 775 tests whether the two planes are intersecting planes. If not, then step 770 is executed.

If so, then an intersection line is present at the junction of the two planes and step 780 defines and stores the intersection and welding lines. An intersection of two planes typically means the junction of two components which are two be welded together. Therefore, this intersection is defined as a welding line. If the welding line is a straight line then the two end points of the intersection are defined as the end points of the welding line. If either or both of the intersecting planes are curved then the intersection line generally will also be curved. Where there is a curved intersection line then the welding line is represented as a sequence of shorter, straight line segments, the straight line segments being defined as a series of points. Closer spacing of the points provides a more accurate curve but requires more time to calculate and to weld. More distance spacing of the points provides for a rougher curve, but speeds up the calculation process and the welding process. Thus, the spacing of the points is preferably a user-definable parameter and is based upon a tradeoff between the speed and smoothness. The spacing of points may be determined automatically by the controller based upon a user-specified parameter defining the maximum allowable error between the intersection line (the desired curve) and the welding line (the actual curve). The spacing may vary for different welding lines or the spacing may be the same for all welding lines. Thus, the user has the choice for the entire welding process to be smoother or faster.

In an alternative embodiment, the points for the intersection line are input to a curve-fitting program. The program uses the points on the intersection line to select a curve which most closely approximates the intersection line. The curve may be, for example, part of a circle, or part of a parabola. The radius, focal point, or other mathematical characteristics necessary to define the curve are then stored, along with the starting and ending points of the curve, as the definition for that intersection line. Points on the intersection line which deviate more than a user-specified amount from the selected curve may be ignored or may be used to set a flag to alert an operator to review the data to determine whether these deviant points indicate the presence of an unusual shape. The information for the curve is then used in the welding process.

Further, step 780 determines whether there are any other planes which cut across the intersection line. A plane which cuts across the intersection line indicates a member, such as a beam, which the robot cannot weld through. That is, the robot must stop welding when it reaches the member, and then can resume welding, if appropriate, on the other side of the member. Therefore, a plane which cuts across an intersection line defines a starting coordinate or an ending coordinate for that intersection line. Briefly stated, the conjunction of two planes defines a line, and the conjunction of three planes defines a starting or ending point on a line. If there are no planes which cut across the intersection line then the starting and ending coordinates of the intersection line are determined simply by the intersection of the two planes which creates the intersection line. Thus, one intersection line may form one, two or more welding lines, depending upon the number of crossing planes. This information (starting and ending coordinates) for each welding line, is then stored.

Figure 8A:
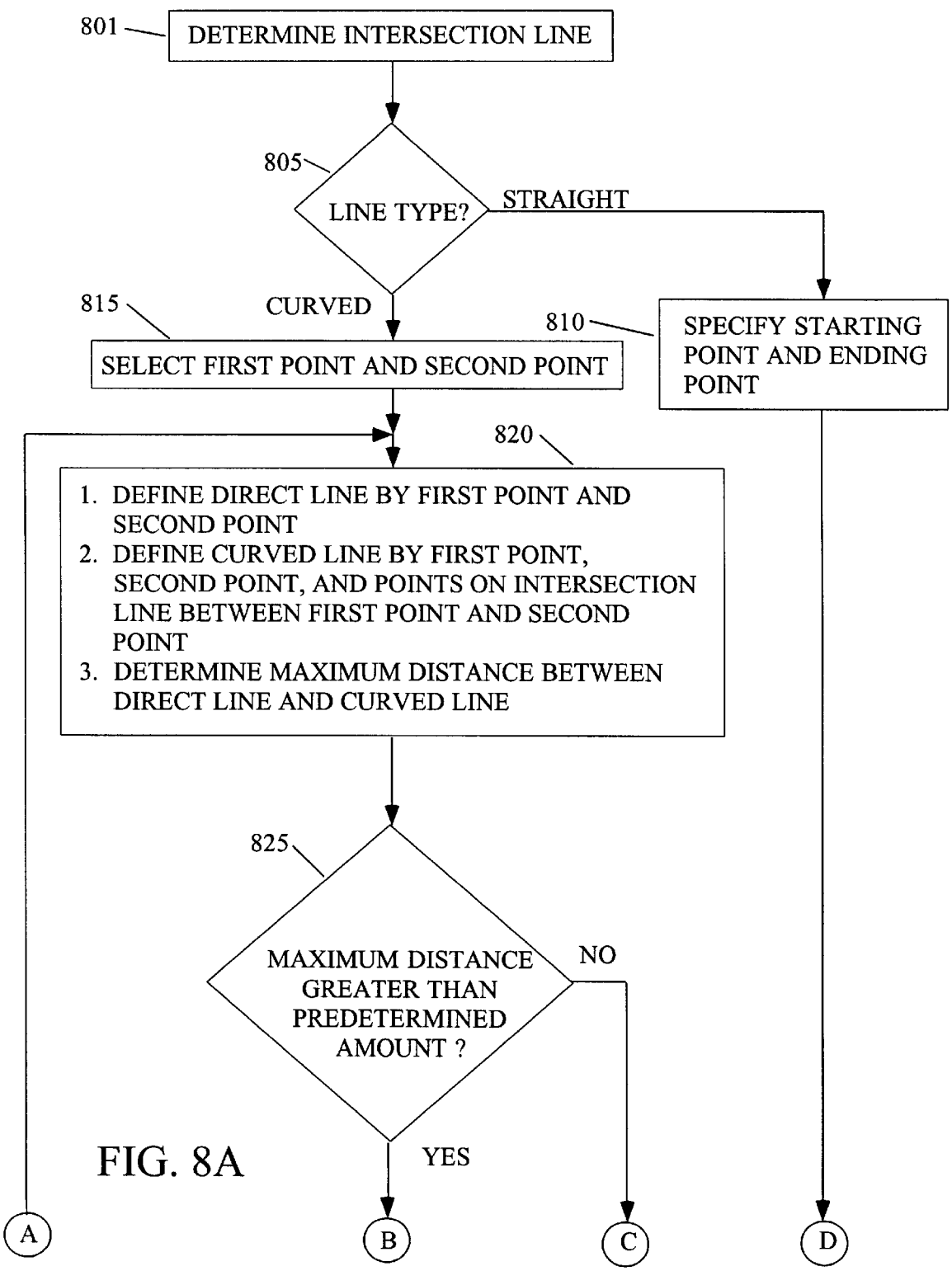
FIGS. 8A and 8B are a flow chart of the process for determining the points of an intersection line.
Figure 8B:
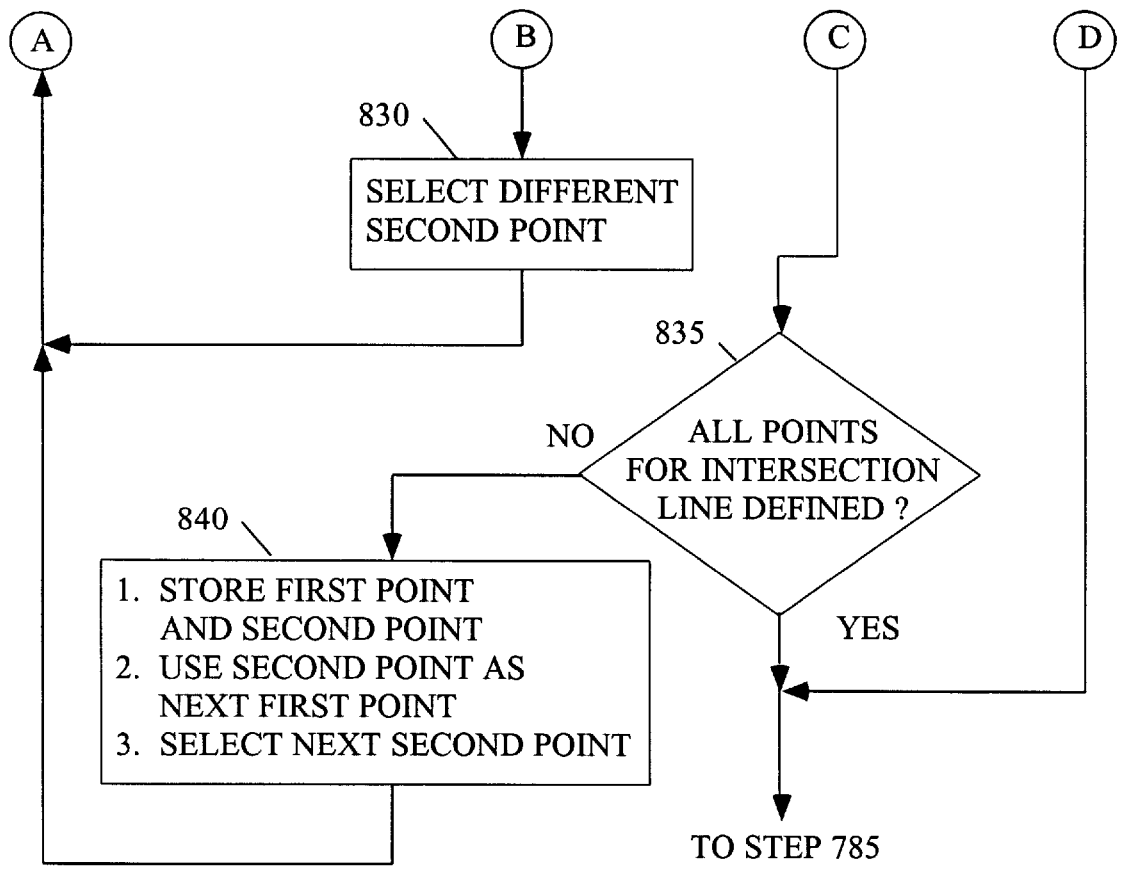

FIGS. 8A and 8B are a flow chart of the above process for determining the points of an intersection line.

Step 785 tests whether all planes have been considered. Preferably, each plane is tested for an intersection with every other plane. If not, then step 765 is executed. If so, then step 790 is executed.

Step 790 tests whether any flags have been set. If not, then step 705 begins execution of the welding operation. Of course, it is also possible to store the information and begin the welding operation at a later time.

If, at step 790, it is determined that a flag has been set then step 795 alerts the operator that there is a condition requiring operator input, displays to the operator each of the planes which has a flag that is set, and accepts the operator input regarding each of these planes. Preferably, the operator will view each plane, find the corresponding plane, and designate that the two planes are corresponding planes. The controller will then use the operator designation to update the plane in the design workpiece plan according to the corresponding plane based upon the observed point information to provide the "as built" workpiece plan. The flag is then cleared for each designated plane. The operator may also review and change any plane information which is incorrect.

Then, step 800 performs steps 765–785 for these planes which have had the flags cleared or the information changed. Finally, step 805 is executed.

It will therefore be appreciated that the present invention has automatically scanned the workpiece, obtained information on the workpiece, updated the design workpiece plans to provide "as built" workpiece plans, and executed the specified welding operation according to the "as built" workpiece plans.

Although the present invention has been described with particularity with respect to its preferred environment, the present invention is not so limited. The present invention is also useful for other operations, such as cutting operations where elements are removed, and "pick and place" operations.

Also, although the present invention has been described with a single controller 20 performing the scanning operation, the data reduction operation, and welding operation, the present invention contemplates that different controllers may be used for these different operations.

It will be appreciated from the above that the present invention provides a method and an apparatus for automatically scanning a workpiece to provide information for performing welding and cutting operations on the workpiece.

From a reading of the description above of the preferred embodiment of the present invention, modifications and variations thereto may occur to those skilled in the art. Therefore, the scope of the present invention is to be limited only by the claims below.

I claim:

1. A method for determining the configuration of an object, comprising the steps of:

setting a first camera to a first camera initial position;

setting a second camera to a second camera initial position;

scanning said object from said first camera initial position to a first camera end position to obtain data on a plurality of first camera observed points for said object, said data for a said first camera observed point including at least one of a picture of said object and ranging information to said object;

scanning said object from said second camera initial position to a second camera end position to obtain data on a plurality of second camera observed points for said object, said data for a said second camera observed point including at least one of a picture of said object and ranging information to said object;

processing said data for said first camera observed points and said second camera observed points to determine valid observed points;

inspecting said valid observed points to define a first plane, said first plane comprising a first plurality of said valid observed points;

inspecting said valid observed points to define a second plane, said second plane comprising a second plurality of said valid observed points;

determining an intersection line for said first plane and said second plane;

determining whether said intersection line is a straight line or is a curved line;

if said intersection line is a straight line then specifying said intersection line by at least a starting point and an ending point; and if said intersection line is a curved line then specifying a plurality of points for said intersection line.

2. A method for determining the configuration of an object, comprising the steps of:

setting a first camera to a first camera initial position;

setting a second camera to a second camera initial position;

scanning said object from said first camera initial position to a first camera end position to obtain data on a plurality of first camera observed points for said object, said data for a said first camera observed point including at least one of a picture of said object and ranging information to said object;

scanning said object from said second camera initial position to a second camera end position to obtain data on a plurality of second camera observed points for said object, said data for a said second camera observed point including at least one of a picture of said object and ranging information to said object;

processing said data for said first camera observed points and said second camera observed points to determine valid observed points;

inspecting said valid observed points to define a first plane, said first plane comprising a first plurality of said valid observed points;

inspecting said valid observed points to define a second plane, said second plane comprising a second plurality of said valid observed points;

determining an intersection line for said first plane and said second plane;

determining whether said intersection line is a straight line or is a curved line;

if said intersection line is a straight line then specifying said intersection line by at least a starting point and an ending point; and if said intersection line is a curved line then performing the steps of:

selecting a first point and a second point for said intersection line, said first point and said second point being points on said intersection line and being separated by a first distance;

defining a direct line by said first point and said second point;

defining a desired curved line by said first point, said second point, and points on said intersection line between said first point and said second point;

determining a maximum difference between said direct line and said desired curved line;

if said maximum difference is greater than a predetermined amount then selecting a different second point, said different second point being separated from said first point by less than said first distance; and repeating said steps of defining said direct line, defining said desired curved line, and determining said maximum difference until said maximum difference is not greater than said predetermined amount; and when said first point and said second point have been selected wherein said maximum difference is not greater than said predetermined amount, storing said first point and said second point and then, using said second point as a next said first point, repeating the above steps until said plurality of points for said intersection line have been selected.

3. An apparatus for determining the configuration of an object, comprising:

a first camera for scanning said object to obtain data on a plurality of first camera observed points for said object, said data for a said first camera observed point including at least one of a picture of said object and ranging information to said object;

a second camera for scanning said object to obtain data on a plurality of second camera observed points for said object, said data for a said second camera observed point including at least one of a picture of said object and ranging information to said object;

first means for moving said first camera along a first path from a first camera initial position to a first camera end position;

second means for moving said second camera along a second path from a second camera initial position to a second camera end position; and a controller for controlling the operation of said first camera, said second camera, said first means, and said second means, for receiving said data, for processing said data for said first camera observed points and said second camera observed points to determine valid observed points, and processing said valid observed points to define a first plane and a second plane, for determining an intersection line for said first plane and said second plane, for determining whether said intersection line is a straight line or is a curved line, for specifying said intersection line by at least a starting point and an ending point if said intersection line is a straight line, and for specifying a plurality of points for said intersection line if said intersection line is a curved line.

4. An apparatus for determining the configuration of an object, comprising:

a first camera for scanning said object to obtain data on a plurality of first camera observed points for said object, said data for a said first camera observed point including at least one of a picture of said object and ranging information to said object;

a second camera for scanning said object to obtain data on a plurality of second camera observed points for said object, said data for a said second camera observed point including at least one of a picture of said object and ranging information to said object;

first means for moving said first camera along a first path from a first camera initial position to a first camera end position;

second means for moving said second camera along a second path from a second camera initial position to a second camera end position; and a controller for controlling the operation of said first camera, said second camera, said first means, and said second means, for receiving said data, for processing said data for said first camera observed points and said second camera observed points to define a first plane and a second plane, for determining an intersection line for said first plane and said second plane, for determining whether said intersection line is a straight line or is a curved line, for specifying said intersection line by at least a starting point and an ending point if said intersection line is a straight line, and, if said intersection line is a curved line then for selecting a first point and a second point for said intersection line, said first point and said second point being points on said intersection line and being separated by a first distance, for defining a direct line by said first point and said second point, for defining a desired curved line by said first point, said second point, and points on said intersection line between said first point and said second point, for determining a maximum difference between said direct line and said desired curved line, for selecting a different second point if said maximum difference is greater than a predetermined amount, said different second point being separated from said first point by less than said first distance, until said maximum difference is not greater than said predetermined amount, and then for storing said first point and said second point, for using said second point as a next said first point, and for defining additional direct lines until said plurality of points for said intersection line have been selected.

* * * * *